United States Patent [19]

Lee

[11] Patent Number: 5,751,370
[45] Date of Patent: May 12, 1998

[54] HORIZONTAL SIZE ADJUSTING APPARATUS OF A MONITOR

[75] Inventor: Moon-Keol Lee, Seoul, Rep. of Korea

[73] Assignee: Daewoo Electronics Co., Ltd., Seoul, Rep. of Korea

[21] Appl. No.: 549,648

[22] Filed: Oct. 27, 1995

[30] Foreign Application Priority Data

Oct. 28, 1994 [KR] Rep. of Korea .................. 94-27891

[51] Int. Cl.$^6$ ................................................. H04N 5/46
[52] U.S. Cl. ........................ 348/556; 348/704; 315/371
[58] Field of Search ................................ 348/556, 704, 348/445, 581; 318/371; H04N 5/46

[56] References Cited

U.S. PATENT DOCUMENTS

| | | | |
|---|---|---|---|
| 4,763,194 | 8/1988 | Osman | 348/7.4 |
| 4,795,946 | 1/1989 | Nishiyama | 315/371 |
| 4,942,471 | 7/1990 | Chikuma | 348/704 |
| 5,164,639 | 11/1992 | Shimaoka et al. | 315/371 |
| 5,444,338 | 8/1995 | George | 315/371 |
| 5,576,771 | 11/1996 | Van Tol | 348/556 |

Primary Examiner—Victor R. Kostak
Attorney, Agent, or Firm—Fish & Richardson

[57] ABSTRACT

A horizontal size adjusting apparatus of a monitor capable of varying size and linearity of a deflection signal by varying an amount of current supplied to a deflection circuit in accordance with a horizontal frequency includes a first current controlling section for generating a plurality of first control signals to vary the amount of current supplied to the deflection circuit and adjusting a horizontal size by correcting the size and linearity of the deflection signal in accordance with first control signals, a second current controlling section for generating second control signals to vary the amount of current supplied to the deflection circuit by receiving output signals of a decoder and adjusting the horizontal size by correcting the size and linearity of the deflection signal in accordance with the second control signals, and a current output section for supplying the amount of current varied by the first and second current controlling sections to the deflection circuit. By varying the size and linearity of the deflection signal in accordance with the output current of the current output section, the horizontal size is accurately adjusted while improving picture quality.

12 Claims, 7 Drawing Sheets

FIG.5

| HS BANDWIDTH | M2 | M1 | M0 | Y7 | Y6 | Y5 | Y4 | Y3 | Y2 | Y1 | Y0 | S1 | S2 | S3 | S4 |
|---|---|---|---|---|---|---|---|---|---|---|---|---|---|---|---|
| -30    | L | L | L | H | H | H | H | H | H | H | L | L | L | L | L |
| 30-34  | L | L | H | H | H | H | H | H | H | L | H | H | H | H | H |
| 34-40  | L | H | L | H | H | H | H | H | L | H | H | L | H | H | H |
| 40-50  | L | H | H | H | H | H | H | L | H | H | H | L | L | H | H |
| 50-60  | H | L | L | H | H | H | L | H | H | H | H | L | L | H | H |
| 60-70  | H | L | H | H | H | L | H | H | H | H | H | L | L | H | H |
| 70-80  | H | H | L | H | L | H | H | H | H | H | H | L | L | L | L |
| 80-    | H | H | H | L | H | H | H | H | H | H | H | L | L | L | L |

FIG.8

| HS BANDWIDTH | -30 | 30-34 | 34-40 | 40-50 | 50-60 | 60-70 | 70-80 | 80- |
|---|---|---|---|---|---|---|---|---|
| M2 | L | L | L | L | H | H | H | H |
| M1 | L | L | H | H | L | L | H | H |
| M0 | L | H | L | H | L | H | L | H |
| Y7 | H | H | H | H | H | H | H | L |
| Y6 | H | H | H | H | H | H | L | H |
| Y5 | H | H | H | H | H | L | H | H |
| Y4 | H | H | H | H | L | H | H | H |
| Y3 | H | H | H | L | H | H | H | H |
| Y2 | H | H | L | H | H | H | H | H |
| Y1 | H | L | H | H | H | H | H | H |
| Y0 | L | H | H | H | H | H | H | H |
| S1 | L | H | L | L | L | L | L | L |
| S2 | L | H | H | L | L | L | L | L |
| S3 | L | H | H | H | H | H | L | L |
| S4 | L | H | H | H | H | H | L | L |
| ... | ⋮ | ⋮ | ⋮ | ⋮ | ⋮ | ⋮ | ⋮ | ⋮ |
| S0 | H | L | L | L | L | L | L | L |

1

HORIZONTAL SIZE ADJUSTING APPARATUS OF A MONITOR

BACKGROUND OF THE INVENTION

1. Field of the Invention

The present invention relates to a monitor capable of performing a multi-scan, and more particularly to a horizontal size adjusting apparatus of a monitor capable of controlling a horizontal size by varying an amount of current supplied to a deflection circuit in accordance with a horizontal frequency.

2. Description of the Prior Art

As illustrated in FIG. 1, a general monitor 10 externally receives a vertical frequency Vs and a horizontal frequency Hs. Vertical frequency Vs and horizontal frequency Hs are supplied to a microprocessor 1 of monitor 10. According to this operation, microprocessor 1 produces a mode signal, e.g., a signal displaying a VGA mode or SUPER VGA mode, and a pulsewidth modulation signal. Microprocessor 1 is connected to an on-screen/video signal processor 2 to supply the mode signal thereof to on-screen/video signal processor 2. By doing so, on-screen/video signal processor 2 processes an externally supplied first video signal V and/or an on-screen signal OSD to provide a second video signal which is supplied to a cathode ray tube CRT of monitor 10. Meanwhile, a deflection circuit 3 is connected to an output side of microprocessor 1. The mode signal of microprocessor 1 is supplied to deflection circuit 3. At the same time, horizontal and vertical frequencies Hs and Vs are supplied to deflection circuit 3. Thus, deflection circuit 3 generates a deflection signal of a triangular waveform. Cathode ray tube CRT is connected to an output side of deflection circuit 3 to receive the deflection signal. Meantime, a size adjusting circuit 4 is connected to the output side of microprocessor 1. The pulsewidth modulation signal is supplied to size adjusting circuit 4. Therefore, size adjusting circuit 4 corrects the size and linearity of the deflection signal of deflection circuit 3. Deflection circuit 3 is connected to an output side of size adjusting circuit 4, so that an output current A of size adjusting circuit 4 is supplied to deflection circuit 3.

An operation of the monitor constructed as above will be described below.

Externally-supplied horizontal and vertical frequencies Hs and Vs are provided to microprocessor 1 which outputs the mode signal and pulsewidth modulation signal. The mode signal of microprocessor 1 is supplied to on-screen/video signal processor 2 which processes externally-supplied first video signal V or/and on-screen signal OSD to output the second video signal. The second video signal is then supplied to cathode ray tube CRT. The mode signal of microprocessor 1 and vertical and horizontal frequencies Vs and Hs are supplied to deflection circuit 3 which generates the deflection signal of the triangular waveform. The deflection signal of deflection circuit 3 is supplied to cathode ray tube CRT.

The pulsewidth modulation signal of microprocessor 1 is supplied to size adjusting circuit 4. In response to this, size adjusting circuit 4 determines output current A corresponding to the pulsewidth modulation signal. Output current A of size adjusting circuit 4 is supplied to deflection circuit 3. At this time, as output current A of size adjusting circuit 4 is large, the horizontal size of a screen becomes small.

FIG. 2 is a schematic view showing a construction of the size adjusting circuit of FIG. 1; FIG. 3 is a detailed circuit diagram showing the control signal generator in FIG. 2; and FIG. 4 is a detailed circuit diagram showing a construction of the controlling section and current output section.

Assuming that horizontal frequency Hs below 30 KHz is supplied to microprocessor 1 in FIG. 2, microprocessor 1 produces signals on low potential state, e.g., pulsewidth modulation signals $M_0 \sim M_m$ of zero volt. Pulsewidth modulation signals $M_0 \sim M_m$ are supplied to a decoder 41 which decodes M+1 signals $M_0 \sim M_m$. Consequently, decoder 41 outputs N+1 signals $Y_0 \sim Y_n$. That is, first output signal $Y_0$ of decoder 41 is provided on the low potential state. Simultaneously, second output signal $Y_1$ to Nth output signal $Y_n$ of decoder 41 are provided on the high potential state, e.g., of 5 volts. Output signals $Y_1 \sim Y_n$ of decoder 41 are supplied to a control signal generator 42.

Referring to FIG. 3, control signal generator 42 will be described as below.

Second output signal $Y_1$, and third output signal $Y_2$ of decoder 41 are supplied to an AND gate AND21 of control signal generator 42. AND gate AND21 logically produces second output signal $Y_1$ and third output signal $Y_2$ to output a signal on the high potential state. The obtained result and fourth output signal $Y_3$ are logically produced by an AND gate AND22 to output a signal on the high potential state. The above-stated operation is repeated for N−1 times. Accordingly, all output signals of AND gate AND21 to AND2(n−1) are provided on the high potential state.

The output signals of AND gates AND21 to AND2(n−1) are supplied to respective inverters I21 to I2(n−1) which invert the output signals of AND gate AND21 to AND2(n−1) to generate control signals $S_1 \sim S_{(n-1)}$ on the low potential state. Control signals $S_1 \sim S_{(n-1)}$ are supplied to a switching part 43.

Switching part 43 is formed to output switching signals $P_0 \sim P_{n-1}$ on the high potential state when supplied signals $S_1 S_{(n-1)}$ are on the low potential state, and a field effect transistor may be employed to construct switching part 43.

In more detail, switching part 43 outputs switching signals $P_0 \sim P_{n-1}$ which are on the high potential state. Switching signals $P_0 \sim P_{n-1}$ are supplied to capacitors C41~C4(n−1) of a controlling section 44 as shown in FIG. 4. Therefore, capacitors C41~C4(n−1) are charged, and discharge currents $i_1 \sim i_{n-1}$ of capacitors C41~C4(n−1) are zero. At this time, an output current $O_1$ of controlling section 44 is obtained by summing discharge currents $i_1 \sim i_{n-1}$. Output current O1 is supplied to a transistor Q51 of a current output section 45.

Current output section 45 determines output current A in accordance with output current $O_1$. That is, output current $O_1$ is supplied to a collector side of transistor Q51 of current output section 45, and simultaneously supplied to a capacitor C51. The collector side of transistor Q51 and one end of capacitor C51 are connected. Also, deflection circuit 3 is connected to the collector side of transistor Q51. Other end of capacitor C51 is grounded. An emitter side of transistor Q51 is grounded, too.

A power source Vcd is supplied to a base side of transistor Q51. Due to this connection, transistor Q51 is switched under a normally turned-on state. Accordingly, capacitor C51 is discharged. Discharge current i51 is determined by a time constant of capacitor C51. Discharge current i51 of capacitor C51 is supplied to the collector side of transistor Q51.

Thus, output current A of transistor Q51 is discharge current i51. Output current A of transistor Q51 is supplied to deflection circuit 3 in which the linearity and size of the deflection signal is varied in accordance with output current A of transistor Q51. The deflection signal is supplied to a deflection coil of cathode ray tube CRT. The horizontal size of the screen varies in accordance with the linearity and size of the deflection signal.

Meanwhile, it is assumed that horizontal frequency Hs ranging from 30 K Hz to 34 KHz is supplied to microprocessor 1. At this time, pulsewidth modulation signal M0 of microprocessor 1 is provided on the low potential state, and simultaneously pulsewidth modulation signals $M_1 \sim M_m$ are provided on the high potential state. Pulsewidth modulation signals $M_1 \sim M_m$ are supplied to decoder 41 which decodes M+1 signals $M_0 \sim M_m$. Consequently, decoder 41 outputs N+1 signals $Y_0 \sim Y_n$. That is, first output signal $Y_0$ of decoder 41 is provided on the high potential state, second output signal $Y_1$ is on the low potential state, and third output signal $Y_2$ to (N+1)th output signal $Y_n$ are provided on the high potential state. Output signals $Y_0 \sim Y_n$ of decoder 41 are supplied to control signal generator 42.

Second output signal $Y_1$ and third output signal $Y_2$ of decoder 41 are supplied to AND gate AND21 of control signal generator 42. AND gate AND21 logically produces second output signal $Y_1$ and third output signal $Y_2$ to output the signal on the low potential state. This obtained result and fourth output signal $Y_3$ are logically produced by AND gate AND22 to output the signal on the low potential state. The above-stated operation is repeated for N-1 times. Consequently, all output signals of AND gates AND21 to AND2(n-1) are provided on the low potential state.

The output signals of AND gates AND21~AND2(n-1) are supplied to inverters I21 to I2(n-1) which invert the output signals of AND gates AND21 to AND2(n-1). Inverted control signals $S_1 \sim S(n-1)$ on the high potential state are supplied to switching part 43.

Switching part 43 outputs switching signals $P_0 \sim P_{n-1}$ on the low potential state to supply them to capacitors C41~C4 (n-1) of controlling section 44 as shown in FIG. 4, thereby effecting the discharge operation. Therefore, discharge currents $i_1 \sim i_{n-1}$ of capacitors C41~C4(n-1) are determined by time constants of capacitors C41~C4(n-1). Output current O1 of controlling section 44 is obtained by summing discharge currents $i_1 \sim i_{n-1}$, which is supplied to the collector side of transistor Q51 of current output section 45.

On the other hand, power source Vcd is applied to the base side of transistor Q51. Due to this connection, transistor Q51 is switched under normally turned-on state. Accordingly, discharge current i51 of capacitor C51 is supplied to the collector side of transistor Q51. Thus, discharge currents $i_0 \sim i_{n-1}$ and discharge current $i_{51}$ are supplied to the collector side of transistor Q51.

Output current A of current output section 45 is obtained by summing output current O1 and discharge current i51 of controlling section 44. Output current A is supplied to deflection circuit 3 in which the linearity and size of the deflection signal is varied in accordance with output current A of transistor Q51. The deflection signal is supplied to the deflection coil of cathode ray tube CRT. Also, the horizontal size of the screen is varied in accordance with the linearity and size of the deflection signal.

However, when horizontal frequency Hs exceeds 30 KHz, output current A of transistor Q51 becomes large as compared with a case of being below 30 KHz. Due to this fact, the size of the deflection signal is further increased, and the horizontal size is reduced at this time.

In the horizontal size adjusting apparatus of a general monitor having decoder 41 with m input signals and decoded n output signal, the input signals numbers m, and a decoder for decoding the output signals by n, the outputs of respective sections are as shown in FIG. 5 provided that m=1 and n=7.

In the conventional monitor, as presented in FIG. 5, control signals $S_1 \sim S_7$ are the same one another when horizontal frequency Hs is below 30 KHz and beyond 80 KHz. Output current A of current output section 45 becomes discharge current i51 of capacitor C51. That is, it is determined that horizontal frequency Hs exceeds 80 KHz in spite that it is 30 KHz, thereby reducing the horizontal size.

When horizontal frequency Hs becomes lower than 30 KHz instantaneously at the moment a mode of monitor 10 is changed or horizontal frequency Hs is continuously lower than 30 KHz, output current A of transistor Q51 is discharge current i51 of capacitor C51. Therefore, overload is imposed from deflection circuit 3 upon the collector side of transistor Q51, which becomes a factor of destructing transistor Q51.

SUMMARY OF THE INVENTION

It is an object of the present invention to provide a horizontal size adjusting apparatus of a monitor for preventing a transistor from being destructed to improve reliability of a product.

To achieve the above object of the present invention, there is provided a monitor including a microprocessor for setting a mode of the monitor in accordance with a horizontal frequency to produce a mode signal and pulsewidth modulation signals, a decoder for decoding the pulsewidth modulation signals of the microprocessor, and a first control signal generator for generating first control signals which correct size and linearity of a deflection signal by varying an amount of current supplied to a deflection circuit in accordance with the output signal of the decoder.

A first switching part for switching in accordance with the first control signals is connected to an output side of the first control signal generator and a first controlling section for determining the amount of current supplied to the deflection circuit in accordance with the output signal of the first switching part is connected to an output side of the first switching part.

Meanwhile, an output side of the decoder is connected with a second control signal generator for generating second control signals which correct the size and linearity of the deflection signal by varying the amount of current supplied to the deflection circuit and adjusting a horizontal size in accordance with the size of the corrected deflection signal, and an output side of the second control signal generator is connected with a second switching part for switching in accordance with the second control signals to output switching signals.

A second controlling section for controlling the amount of current supplied to a deflection coil in accordance with the switching signals to adjust the horizontal size is connected to an output side of the second switching part when the horizontal frequency is smaller than 30 KHz, and a current output section for providing an output current determined by the first and second controlling section is connected to the output sides of the first and second controlling sections.

When the horizontal frequency is smaller than 30 KHz, a first output signal of the decoder is supplied. At this time, the first output signal is on the low potential state. The first output signal is supplied to the second control signal generator which then inverts the first output signal. The second control signal generator supplies second switching signals on the high potential state to the second control section. Thus, second controlling section is discharged, and discharge current of the second controlling section is supplied to a current output section. Therefore, the output current of the current output section is increased, and then supplied to the deflection circuit. As a result, the current output section can be prevented from being damaged due to the overload from the deflection circuit.

BRIEF DESCRIPTION OF THE DRAWINGS

The above objects and other advantages of the present invention will become more apparent by describing in detail preferred embodiments thereof with reference to the attached drawings in which:

FIG. 5 is a table presenting the output signals of respective sections of FIG. 2;

FIG. 8 is a table presenting the output signals of respective sections in FIG. 7.

DETAILED DESCRIPTION OF THE PREFERRED EMBODIMENT

Figure 1:
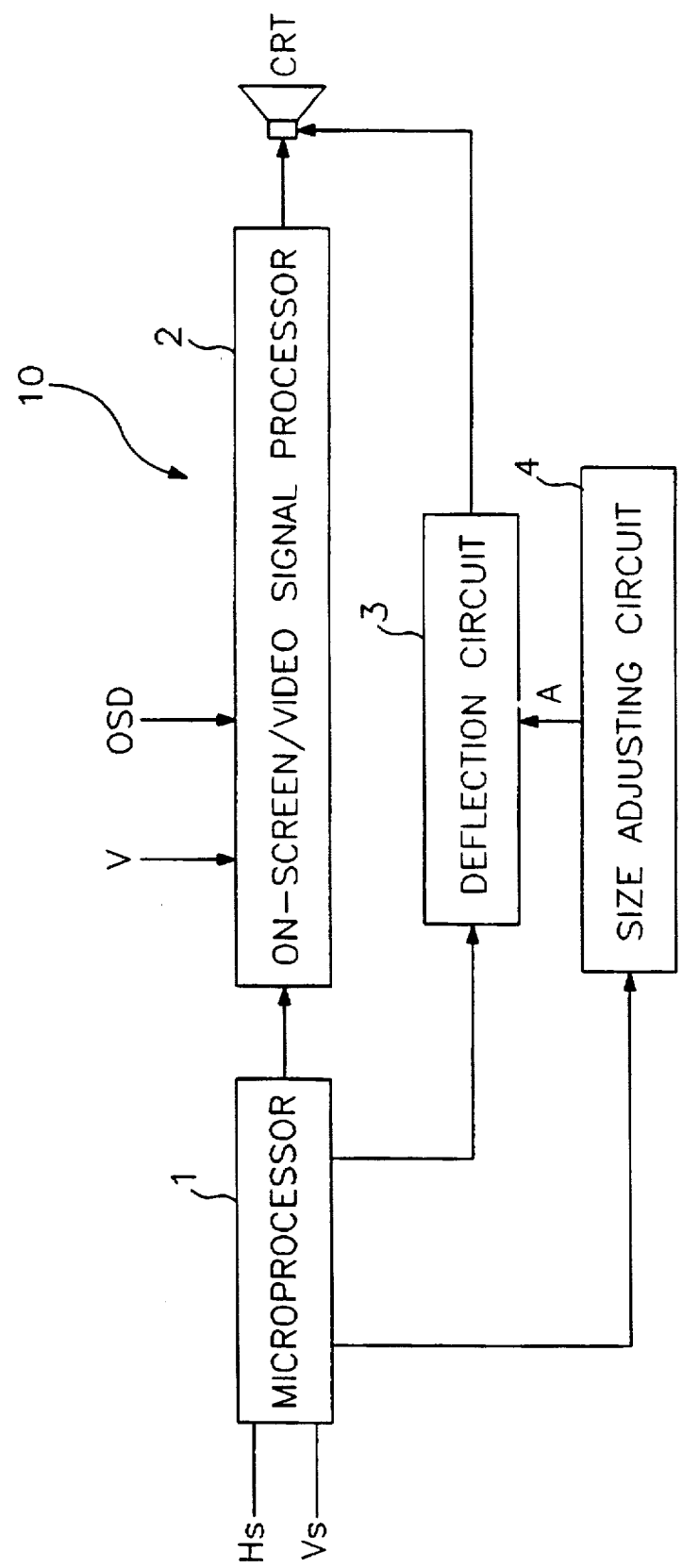
FIG. 1 is a view showing a construction of a general monitor.
Figure 2:
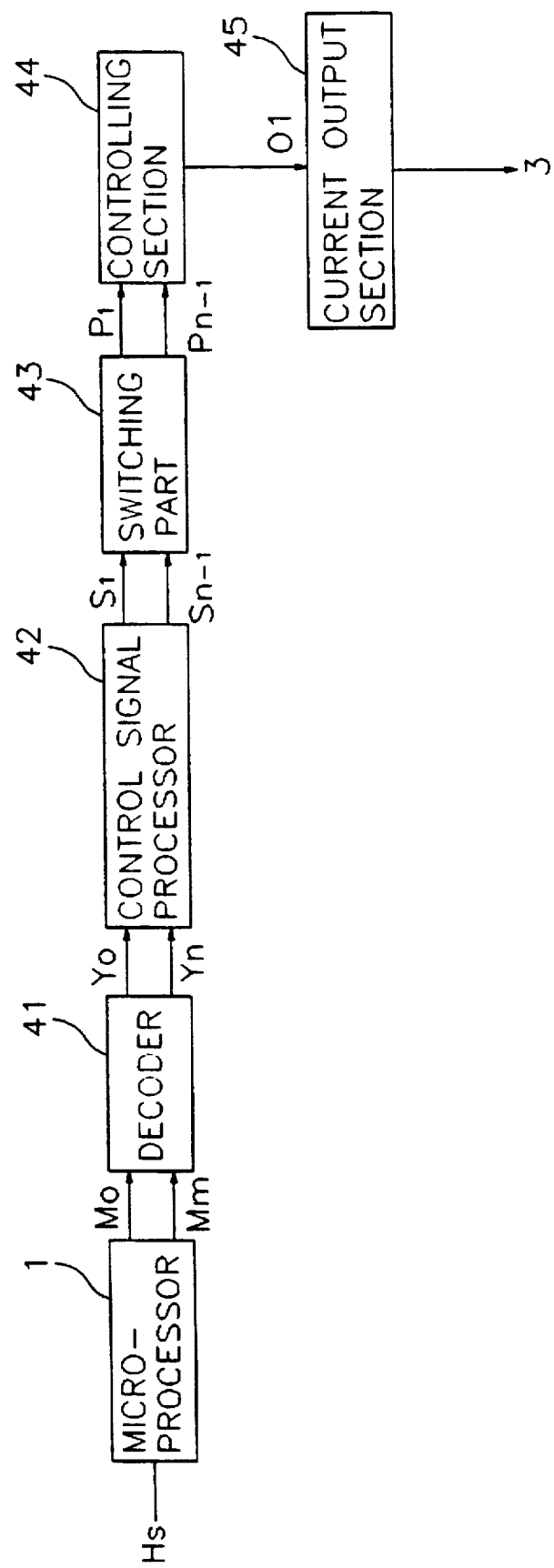
FIG. 2 is a schematic view showing a construction of the size adjusting circuit of FIG. 1.
Figure 3:
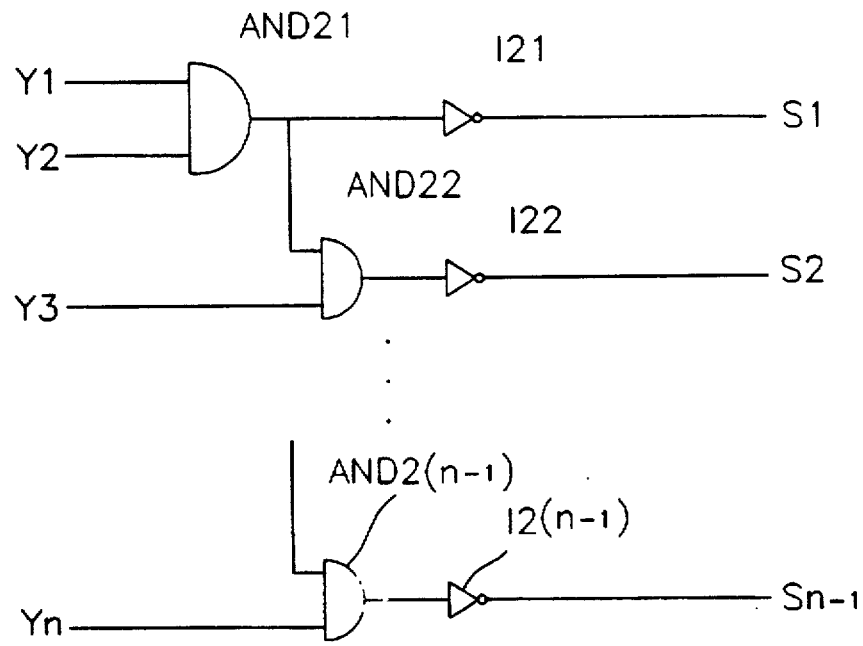
FIG. 3 is a detailed circuit diagram showing a construction of the control signal generator.

A horizontal size adjusting apparatus of a monitor according to one embodiment of the present invention will be described in detail with reference to FIGS. 6 and 7, in which the description of sections performing the same operation in the above-described conventional monitor will be omitted.

An output side of a microprocessor 1 is connected with a decoder 51 of a size adjusting circuit 4. Pulsewidth modulation signals $M_0 \sim M_m$ of microprocessor 1 are supplied to decoder 51 which decodes M+1 pulsewidth modulation signals $M_0 \sim M_m$ to output N+1 signals $Y_0 \sim Y_n$. An output side of decoder 51 is connected with a first control signal generator 52. Output signals $Y_0 \sim Y_n$ of decoder 51 are supplied to first control signal generator 52 which logically produces output signals $Y_1 \sim Y_n$ and inverts the results. By this operation, first control signals $S_1 \sim S_{(n-1)}$ are produced from first control signal generator 52. A first switching part 53 is connected to an output side of first control signal generator 52. Control signals $S_1 \sim S_{(n-1)}$ of first control signal generator 52 are supplied to first switching part 53 in which first switching signals $P_1 \sim P_{n-1}$ are output on the low potential state when first control signals $S_1 \sim S_{(n-1)}$ are received on the high potential state. A first controlling section 54 is connected to an output side of first switching part 53. First switching signals $P_1 \sim P_{n-1}$ of first switching part 53 are supplied to first controlling section 54 to charge or discharge capacitors C41~C4(n-1). Thus, discharge currents $i_1 \sim i_{n-1}$ of capacitors C41~C4(n-1) are provided from first controlling section 54. An output side of first controlling section 54 is connected with a current output section 58. That is, discharge currents $i_1 \sim i_{n-1}$ of first controlling section 54 are supplied to a collector side of a transistor Q51 of current output section 58. At this time, output current O1 of first controlling section 54 is obtained by summing discharge currents i1~in-1.

On the other hand, a first output side of decoder 51 is connected with a second control signal generator 55. First output signal $Y_0$ of decoder 51 is supplied to second control signal generator 55 to be inverted, thereby providing second control signal $S_0$.

An output side of second control signal generator 55 is connected with a second switching part 56. Second control signal S0 of second control signal generator 55 is supplied to second switching part 56 to output second switching signal $P_0$ on the low potential state when second control signal $S_0$ is on the high potential state.

An output side of second switching part 56 is connected with a second controlling section 57. Second switching signal $P_0$ of second switching part 56 is supplied to second controlling section 57 to charge or discharge. Therefore, second controlling section 57 outputs discharge current i71.

An output side of second controlling section 57 is connected with current output section 58. Output current O1 of first controlling section 54 and discharge current i71 of second controlling section 57 are supplied to current output section 58.

Output current A is determined in current output section 58 in accordance with output current O1 and discharge current i71. In more detail, output current O1 and discharge current i71 are supplied to a collector side of a transistor Q81 of current output section 58, and simultaneously to a capacitor C81. The collector side of transistor Q81 is connected to one end of capacitor C81. Also, the collector side of transistor Q81 is connected with deflection circuit 3. Other end of capacitor C81 is grounded. A base side of transistor Q81 is applied with externally-supplied power source Vcd. An emitter of transistor Q81 is grounded.

Figure 6:
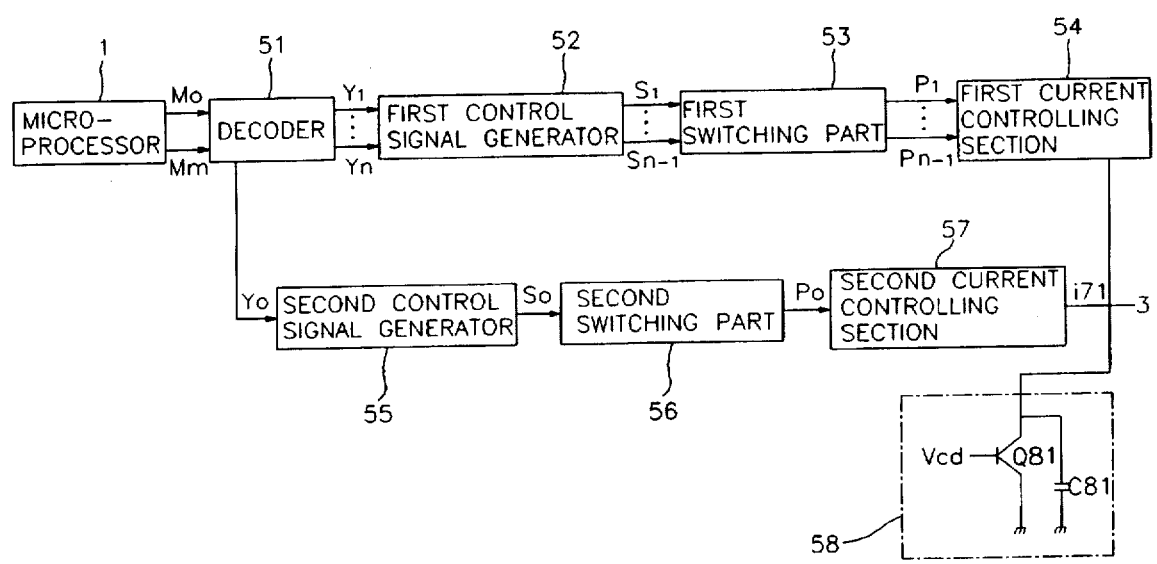
FIG. 6 is a block diagram showing a construction of a size adjusting circuit according to the present invention.
Figure 7:
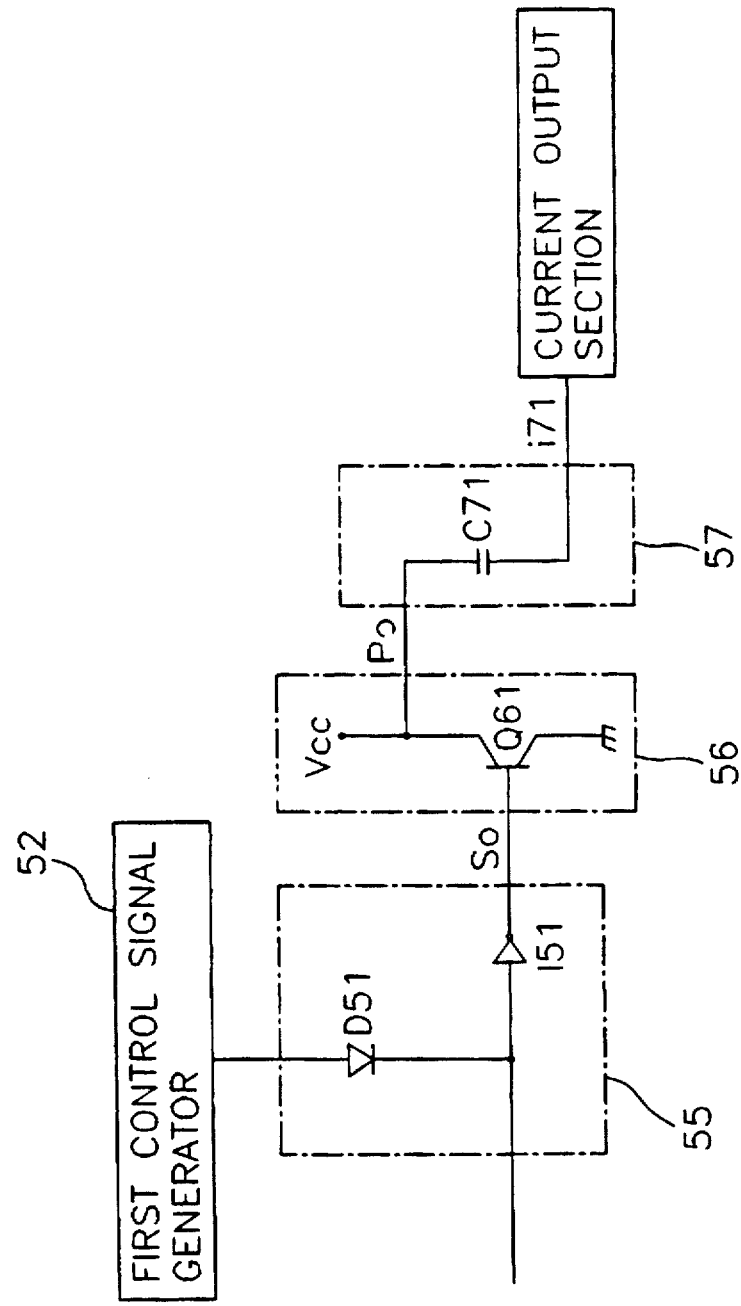
FIG. 7 is a detailed circuit diagram showing constructions of the second control signal generator, second switching part and second controlling section in FIG. 6.

FIG. 7 is a detailed circuit diagram showing a construction of second control signal generator 55, second switching part 56 and second controlling section 57 in FIG. 6.

More specifically, first output side of decoder 51 is connected to one end of an inverter I51 of second control signal generator 55. First output signal $Y_0$ of decoder 51 is supplied to inverter I51 to be inverted, thereby outputting second control signal $S_0$.

The first output side of decoder 51 is connected with a diode D51 of second control signal generator 55. Other end of diode D51 is connected with first control signal generator 52. First output signal $Y_0$ of decoder 51 is supplied to diode D51 which cuts off the supply of first output signal $Y_0$ to first control signal generator 52.

A transistor Q61 of second switching part 56 is connected to other end of inverter I51 of second control signal generator 55. In more detail, second control signal $S_0$ of inverter I51 is supplied to a base side of transistor Q61, and at the same time, externally-supplied power source Vcc is supplied to a collector side of a transistor Q71. An emitter side of transistor Q61 is grounded.

Transistor Q61 generates second switching signal $P_0$ on the low potential state when second control signal $S_0$ is on the high potential state. A collector side of transistor Q61 is connected with one end of a capacitor C71 of second controlling section 57. Capacitor C71 charges or discharges second switching signal $P_0$. Capacitor C71 outputs discharge current i71. Other end of capacitor C71 is connected with current output section 58 to supply discharge current i71 of capacitor C71 to current output section 58.

Hereinbelow, an operation of the horizontal size adjusting apparatus of the monitor according to the present invention will be described in detail.

When assuming that horizontal frequency Hs below 30 KHz is supplied to microprocessor 1, microprocessor 1 outputs pulsewidth modulation signals $M_0 \sim M_m$ on the low potential state.

Pulsewidth modulation signals $M_0 \sim M_m$ are applied to decoder 51 to decode M+1 pulsewidth modulation signals $M_0 \sim M_m$ into N+1 signals $Y_0 \sim_n$. At this time, first output signal $Y_0$ of decoder 51 is produced on the low potential state, and at the same time, second output signal $Y_1$ to (N+1)th output signal $Y_n$ are produced on the high potential state.

First output signal $Y_1$ to (N+1)th output signal $Y_n$ of decoder 51 are supplied to first control signal generator 52. More specifically, second output signal $Y_1$ and third output signal $Y_2$ of decoder 51 are supplied to AND gate AND21 of first control signal generator 52. AND gate AND21 logically produces second output signal $Y_1$ and third output signal $Y_2$ to output the signal on the high potential state. The obtained result and fourth output signal $Y_3$ are logically produced by an AND gate AND22 to output the signal on the high potential state.

The above-stated operation is repeated for N–1 times. Accordingly, all output signals of AND gates AND21 to AND2(n–1) are provided on the high potential state.

The output signals of AND gates AND21 to AND2(n–1) are supplied to respective inverters 121 to I2(n–1) which invert the output signals of AND gates AND21 to AND2 (n–1) to generate first control signals $S_1 \sim S_{(n-1)}$ on the low potential state. First control signals $S_1 \sim S_{(n-1)}$ are supplied to first switching part 53.

First switching part 53 outputs first switching signals $P_0 \sim P_{n-1}$ which are on the high potential state. First switching signals $P_0 \sim P_{n-1}$, are supplied to capacitors C41~C4(n–1) of first controlling section 54. First switching signals $P_0 \sim P_{n-1}$ are charged in respective capacitors C41~C4(n–1). At this time, discharge currents $i_1 \sim i_{n-1}$ of capacitors C41~C4(n–1) become zero. Consequently, output current O1 of first controlling section 54 becomes zero. Also, output current O1 is supplied to the collector side of transistor Q81.

First output signal $Y_0$ of decoder 51 is supplied to be inverted in inverter I51 of second control signal generator 55, so that control signal $S_0$ on the high potential state is produced.

Second control signal $S_0$ is supplied to the base side of transistor Q61 of second switching part 56, and at the same time, power source Vcc is supplied to the collector side thereof. By this operation, transistor Q61 is switched under the turn-on state to output second switching signal $P_0$. Here, second switching signal $P_0$ is on the low potential state.

Second switching signal $P_0$ of second switching part 56 is supplied to capacitor C71 of second controlling section 57 to be discharged. Here, discharge current i71 is determined by a time constant of capacitor C71. Discharge current i71 is supplied to the collector side of transistor Q81 of current output section 58.

Power source Vcd is supplied to the base side of transistor Q81. Due to this connection, transistor Q81 is switched under the normally turned-on state. Accordingly, capacitor C81 is discharged. Discharge current i81 of capacitor C81 is determined by a time constant of capacitor C81.

Thus, output current A of current output section 58 is determined by discharge current i71 of second controlling section 57 and discharge current i81 of current output section 58. Output current A of current output section 58 is supplied to deflection circuit 3 in which the linearity and size of the deflection signal is adjusted in accordance with discharge currents i71 and i81.

Meanwhile, it is assumed that horizontal frequency Hs ranging from 30 KHz to 34 KHz is supplied to microprocessor 1. At this time, microprocessor 1 outputs pulsewidth modulation signal $M_0$ on the low potential state, and simultaneously pulsewidth modulation signals $M_0 \sim M_m$ are provided on the high potential state. Pulsewidth modulation signals $M_1 \sim M_m$ are supplied to decoder 51 which decodes M+1 pulsewidth modulation signals $M_0 \sim M_m$ into N+1 signals $Y_0 \sim Y_n$. That is, first output signal $Y_0$ of decoder 51 is provided on the high potential state, second output signal $Y_1$ is on the low potential state, and third output signal $Y_2$ to (N+1)th output signal $Y_n$ are provided on the high potential state. Output signals $Y_0 \sim Y_n$ of decoder 51 are supplied to first control signal generator 52.

Second output signal $Y_1$ and third output signal $Y_2$ of decoder 51 are supplied to AND gate AND21 of first control signal generator 52. AND gate AND21 logically produces second output signal $Y_1$ and third output signal $Y_2$ to output the signal on the low potential state. This obtained result and fourth output signal $Y_3$ are logically produced by AND gate AND22 to output the signal on the low potential state.

The above-stated operation is repeated for N–1 times. Accordingly, all output signals of AND gates AND21 to AND2(n–1) are provided on the low potential state.

The output signals of AND gates AND21~AND2(n–1) are supplied to inverters 121 to I2(n–1) which invert the output signals of AND gates AND21 to AND2(n–1) to output first control signals $S_1 \sim S_{(n-1)}$ on the high potential state. First control signals $S_1 \sim S_{(n-1)}$ are supplied to first switching part 53.

Figure 4:
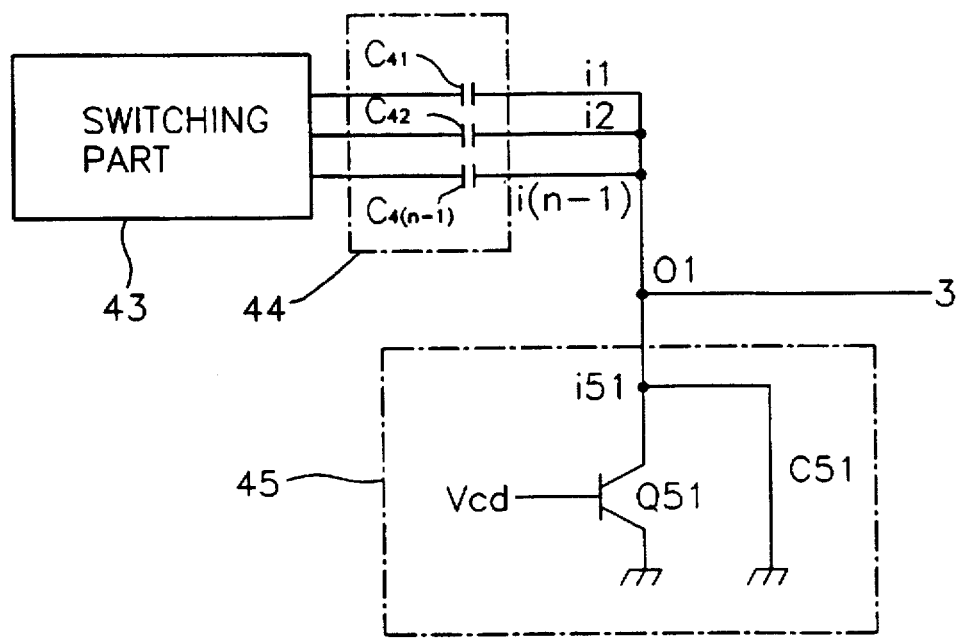
FIG. 4 is a detailed circuit diagram showing a construction of the controlling section and current output section.

First switching part 53 outputs first switching signals $P_0 \sim P_{n-1}$. At this time, first switching signals $P_0 \sim P_{n-1}$ are on the low potential state and are supplied to capacitors C41~C4(n–1) of first controlling section 54, thereby effecting the discharge of respective capacitors C41~C4(n–1). The constitution of the first controlling section 54 in FIG. 6 can be identical with that of the controlling section 44 shown in FIG. 4. Here, discharge currents $i_1 \sim i_{n-1}$ of capacitors C41~C4(n–1) are determined by time constants of capacitors C41~C4(n–1). Output current O1 of first controlling section 54 is obtained by summing discharge currents $i_1 \sim i_{n-1}$, which is supplied to the collector side of transistor Q81 of current output section 58.

On the other hand, first output signal $Y_0$ of decoder 51 is supplied to be inverted in inverter I51 of second control signal generator 55, so that second control signal $S_0$ on the low potential state is generated.

Second control signal $S_0$ is applied to the base side of transistor Q61 of second switching part 56, and at the same time, power source Vcc is supplied to the collector side thereof to switch transistor Q61 under the turn-off state. Consequently, second switching signal $P_0$ on the high potential state is output from transistor Q61.

Since second switching signal $P_0$ of second switching part 56 is supplied to capacitor C71 of second controlling section 57 to be charged, discharge current i71 of capacitor C71 is zero.

Therefore, only output current O1 of first controlling section 54 is supplied to the collector side of transistor Q81 of current output section 58. At this time, power source Vcd is applied to the base side of transistor Q81.

By doing so, transistor Q81 is switched under the turned-on state, and capacitor C81 is discharged. Also, discharge current i81 of capacitor C81 is supplied to the collector side of transistor Q81. Output current O1 and discharge current i81 are supplied to the collector side of transistor Q81.

Then, output current A of transistor Q81 is supplied to deflection circuit 3 in which the linearity and size of the deflection signal is varied in accordance with output current A of transistor Q81. The deflection signal is supplied to the deflection coil of cathode ray tube CRT. The horizontal size of the screen is varied in accordance with the linearity and size of the deflection signal.

In the horizontal size adjusting apparatus of the monitor according to the present invention which includes decoder 51 with m input signals and decoded n output signals, output signals $M_0$~$M_2$ of microprocessor 1, output signals $Y_0$~$Y_7$ of decoder 51 and output signal $S_0$ of second control signal generator 55 are presented as shown in FIG. 8.

When employing the horizontal size adjusting apparatus of the monitor according to the present invention as described above, the amount of current supplied to the deflection circuit is varied in accordance with the horizontal frequency to correct the size and linearity of the deflection signal, and the horizontal size is accurately adjusted in accordance with the size of the corrected deflection signal while eliminating S-shaped distortion by the linearity of the deflection, thereby improving picture quality. In addition, the output current of the current output section is increased when the horizontal frequency is lower than 30KHz to prevent the damage on the transistor caused by the overload from the deflection circuit, thereby improving reliability of products.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A horizontal size adjusting apparatus of a monitor comprising;
   a microprocessor for setting a mode of said monitor in accordance with a received horizontal frequency, and outputting a pulsewidth modulation signal varied in accordance with said received horizontal frequency;
   means for decoding said varied pulsewidth modulation signal from said microprocessor, and for outputting a first plurality of output signals and a second output signal;
   first current controlling means for generating a first plurality of control signals to select a first plurality of capacitors according to said first plurality of output signals to thereby correct size and linearity of a deflection signal in accordance with an output current obtained from said first plurality of capacitors when said horizontal frequency exceeds a predetermined frequency;
   second current controlling means for generating a second control signal to operate another capacitor in accordance with said second output signal to thereby correct said size and linearity of said deflection signal in accordance with an output current of said another capacitor, when said horizontal frequency is lower than said predetermined frequency; and
   current output means for supplying said output current of said first plurality of capacitors or said another capacitor to said deflection circuit.

2. A horizontal size adjusting apparatus of a monitor as claimed in claim 1, wherein said first current controlling means comprises:
   first control signal generating means for generating said first plurality of control signals in accordance with said first plurality of output signals;
   first switching means for switching in accordance with said first plurality of control signals, and for outputting said first plurality of switching signals; and
   first controlling means for charging/discharging said first plurality of capacitors in accordance with said first plurality of switching signals, and for supplying said output current of said first plurality of capacitors to said deflection circuit.

3. A horizontal size adjusting apparatus of a monitor as claimed in claim 1, wherein said second current controlling means comprises:
   second control signal generating means for generating said second control signal in accordance with said second output signal;
   second switching means for switching in accordance with said second control signal, and for outputting said second switching signal; and
   second controlling means for receiving to charge/discharge said another capacitor in accordance with said second switching signal, and for supplying said output current of said another capacitor to said deflection circuit.

4. A horizontal size adjusting apparatus of a monitor as claimed in claim 1, wherein said current output means comprises:
   transistors for supplying the output currents of first current controlling means and second current controlling means to said deflection circuit; and
   capacitors connected to output sides of said transistors for controlling said output currents.

5. A horizontal size adjusting apparatus of a monitor as claimed in claim 2, wherein said first control signal generating means comprises:
   an AND gate for performing a logical production of a second component signal and a third component signal of said first output signal of said decoder;
   a plurality of AND gates for sequentially performing a logical production of the result of said AND gate and succeeding component signals of said first output signal from said decoder; and
   a plurality of inverters for respectively inverting the output signals of said AND gates.

6. A horizontal size adjusting apparatus of a monitor as claimed in claim 3, wherein said second control signal generating means comprises inverters for inverting said second output signal of said decoder.

7. A horizontal size adjusting apparatus of a monitor as claimed in claim 3, wherein said second switching means comprises a transistor for receiving the output signal of said second control signal generating means to output said switching signal.

8. A horizontal size adjusting apparatus of a monitor as claimed in claim 3, wherein said second controlling means comprises a capacitor for being driven by receiving the output signal of said second switching means to apply the result to said current output means.

9. A horizontal size adjusting apparatus of a monitor as claimed in claim 6, wherein said second control signal generating means further comprises means for preventing the supply of said output signal of said decoding means to said first control signal generating means.

10. A horizontal size adjusting apparatus of a monitor as claimed in claim 9, wherein said preventing means is a diode.

11. A horizontal size adjusting apparatus of a monitor as claimed in claim 1, wherein said predetermined frequency is 30 KHz.

12. A horizontal size adjusting apparatus of a monitor comprising:

- a microprocessor for setting a mode of said monitor in accordance with a received horizontal frequency, and for outputting a pulsewidth modulation signal varied in accordance with said received horizontal frequency;
- means for decoding said varied pulsewidth modulation signal from said microprocessor, and for outputting a first plurality of output signals and a second output signal;
- first control signal generating means for generating a first plurality of control signals in accordance with said first plurality of output signals;
- first switching means for switching in accordance with said first plurality of control signals, and for outputting said first plurality of switching signals;
- first controlling means for charging/discharging a first plurality of capacitors in accordance with said first plurality of switching signals, and for supplying said output current of said first plurality of capacitors to said deflection circuit;
- second control signal generating means for generating a second control signal in accordance with said second output signal;
- second switching means for switching in accordance with said second control signal, and for outputting a second switching signal;
- second controlling means for receiving to charge/discharge said another capacitor in accordance with said second switching signal, and for supplying said output current of said another capacitor to said deflection circuit; and
- current output means for supplying said output current of said first plurality of capacitors or said another capacitor to said deflection circuit.

* * * * *